(12) United States Patent
Ananthanarayanan et al.

(10) Patent No.: US 7,664,517 B2
(45) Date of Patent: Feb. 16, 2010

(54) WIRELESS COMMUNICATION SYSTEM UTILIZING A PERSISTENCE VALUE FOR GROUP COMMUNICATION REQUESTS TO REDUCE LATENCY

(75) Inventors: Arulmozhi Kasi Ananthanarayanan, San Diego, CA (US); Harleen K. Gill, San Diego, CA (US); Eric C. Rosen, Solana Beach, CA (US); Ashu Razdan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 11/155,256

(22) Filed: Jun. 16, 2005

(65) Prior Publication Data

US 2005/0288047 A1 Dec. 29, 2005

Related U.S. Application Data

(60) Provisional application No. 60/686,141, filed on May 31, 2005, provisional application No. 60/581,734, filed on Jun. 21, 2004.

(51) Int. Cl.
*H04B 7/00* (2006.01)
*H04Q 7/20* (2006.01)

(52) U.S. Cl. ............... 455/518; 455/519; 455/520; 455/521; 370/461; 370/462; 370/312

(58) Field of Classification Search ......... 455/516–521, 455/416, 417, 422.1, 414.3, 426.2; 370/328, 370/444, 329, 341, 342, 441, 442, 443, 335, 370/461, 462, 347, 411, 312
See application file for complete search history.

(56) References Cited

U.S. PATENT DOCUMENTS 6,295,284 B1 9/2001 Maggenti ............... 370/328

(Continued)

FOREIGN PATENT DOCUMENTS

GB 2290196 12/1995

(Continued)

OTHER PUBLICATIONS

International Search Report, PCT/US2005/022026 - International Search Authority - European Patent Office - Oct. 5, 2005.

(Continued)

*Primary Examiner*—Sujatha Sharma
(74) *Attorney, Agent, or Firm*—Raphael Freiwirth (57) ABSTRACT

A system and method for minimizing latency for direct group communications, such as push-to-talk (PTT) calls, among a group of wireless telecommunication devices on a wireless telecommunication network. The wireless telecommunication device selectively requests and then receives an open dedicated broadcast channel for an outgoing communication, which can include a group communication stream to a communication server that receives and creates a group communication to all wireless telecommunication devices of the designated group. The wireless telecommunication device selectively receives a broadcast channel based upon a predetermined probability, and assigns a greater probability of receiving an open broadcast channel for requests to transmit group communication streams than for requests to open a broadcast channel that are not for a group communication.

22 Claims, 6 Drawing Sheets

U.S. PATENT DOCUMENTS

| | | |
|---|---|---|
| 6,349,210 B1 * | 2/2002 | Li .............................. 455/450 |
| 6,862,273 B2 * | 3/2005 | Rozenstrauch et al. ...... 370/335 |
| 7,139,586 B2 * | 11/2006 | Kreitzer et al. .............. 455/518 |
| 2002/0173325 A1 | 11/2002 | Rosen et al. ................. 455/518 |
| 2003/0005382 A1 * | 1/2003 | Chen et al. ................... 714/748 |
| 2005/0113123 A1 * | 5/2005 | Torvinen .................... 455/519 |

FOREIGN PATENT DOCUMENTS

| | | |
|---|---|---|
| JP | 8-511920 | 12/1996 |
| RU | 2122288 | 5/1993 |
| RU | 2222876 | 1/2004 |
| WO | 03005742 | 1/2003 |

OTHER PUBLICATIONS

Written Opinion, PCT/US2005-022026 - International Search Authority - European Patent Office - Oct. 5, 2005.

International Preliminary Report on Patentability, PCT/US2002/022026 - International Search Authority - The International Bureau of WIPO, Geneva, Switzerland - Dec. 28, 2006.

* cited by examiner

WIRELESS COMMUNICATION SYSTEM UTILIZING A PERSISTENCE VALUE FOR GROUP COMMUNICATION REQUESTS TO REDUCE LATENCY

CROSS-REFERENCE TO RELATED APPLICATIONS

This application claims the benefit of U.S. Provisional Patent Application Ser. No. 60/581,734, filed on Jun. 21, 2004; and U.S. Provisional Patent Application Ser. No. 60/686,141, filed on May 31, 2005. The contents of these documents are incorporated herein by reference.

BACKGROUND OF THE INVENTION

1. Field of the Invention

The present invention generally relates to wireless telecommunication networks. More specifically, the present invention relates to a system and method for providing an open broadcast channel to a group communication, such as Push-to-Talk group communications, in a wireless telecommunication network by increasing the probability that the request to send a group communication will initially receive an open dedicated traffic channel.

2. Description of the Related Art

In a wireless network, the users of wireless communication devices communicate over an air-interface to a central computer. This may be done directly, as in the case of a wireless LAN in an office environment, or it may be done through cellular infrastructure equipment, as in the case of a wireless telephone application. One type of personal communication system is a push-to-talk (PTT) system between mobile wireless communication devices. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor. A specific PTT group of recipient devices for the communicating wireless device is commonly set up by the carrier and the wireless devices themselves do not allow the modification of the group, i.e. to include or drop individuals from the group, or to purposely direct a communication to be received by any fewer members than the entire group.

The typical PTT call involves two users who are rarely located within the same telecommunication sector such that communication and replication of the communication is propagated easily over the existing telecommunication infrastructure. However, a small but very important fraction of push-to-talk calls involve a larger number of call participants, many of whom may also be located within the same sector; public-safety disaster scenarios are one example. In such scenario, the maintenance of the PTT communications within the group all located on the same telecommunication resource is difficult and inefficient. These systems will use "trunks" of the telephone network and standard channel allocation that devote individual circuits for each call participant, thus limiting system scalability.

One problem arises in that a wireless telecommunication device may have a predetermined probability to seize a dedicated communication channel upon request of the user. This delay can minimize the probability of a request collision at the base station. Moreover, in a PTT system, if a large number of receiving wireless devices are in the same sector, there is a high probability that there will be immediate response requests from the group devices, and thus, and increased likelihood of collision. Thus, some internal delay mechanism is desirable to avoid collision, but yet not delay a priority PTT communication. It is thus to such a system and method of reducing latency for the setup of a PTT or direct group communication that the present invention is primarily directed.

SUMMARY OF THE INVENTION

A system and method for minimizing latency for group communications, such as push-to-talk (PTT) calls, from wireless telecommunication devices on a wireless telecommunication network. The wireless telecommunication device selectively requests and then receives, typically through a control or signaling channel, an open dedicated broadcast channel for an outgoing communication, which can include a group communication stream to a communication server that receives and creates a group communication to all wireless telecommunication devices of the designated group. The wireless telecommunication devices selectively receive a broadcast channel based upon a predetermined probability, preferably set at the wireless communication device, and assigns a greater probability of receiving an open broadcast channel for requests to transmit direct group communication streams than for requests open a broadcast channel that are not for a direct group communication.

In one embodiment, the system for minimizing latency for direct group communications among a group of wireless telecommunication devices on a wireless network includes a plurality of wireless telecommunication devices wherein each wireless telecommunication device is able to direct a single group communication stream to a designated group of the plurality of wireless telecommunication devices, with each wireless telecommunication device selectively requesting and then receiving an open dedicated broadcast channel for an outgoing communication from the wireless telecommunication device, to include a direct communication stream from that wireless telecommunication device. The system includes a communication server that receives the single communication stream from a communicating wireless device and creates a group communication to all wireless telecommunication devices of the designated group. At least a set of one or more of the plurality wireless telecommunication devices selectively receives a broadcast channel based upon a predetermined probability, and one or more of the set of wireless telecommunications devices assigns a greater probability of receiving an open broadcast channel for requests to transmit direct group communication streams than for requests to open a broadcast channel that are not for a direct group communication.

In one embodiment, the method for minimizing latency for group communications from a first wireless telecommunication device to a predetermined group of wireless telecommunication devices on a wireless network includes the steps of requesting, at a wireless telecommunication device that is able to direct a single group communication stream to a designated group of a plurality of wireless telecommunication devices on wireless telecommunication network, the opening of a dedicated broadcast channel to the wireless telecommunication network for an outgoing communication from the wireless telecommunication device, then assigning a first probability of opening a communication stream, assigning a second probability for opening a communication stream for a group communication stream, where the second probability is greater than the first probability. If the request for a dedicated broadcast channel is not for a group communication stream, the method includes the step of selectively opening a dedicated broadcast channel based upon the first probability. Otherwise, if the request for a dedicated broadcast channel is for a group communication stream, the method includes the step of selectively opening a dedicated broadcast channel based upon the second probability.

The system and method can therefore allow a predetermined probability to seize a dedicated communication channel upon request of the user to minimize collisions, yet still give priority to direct group communications. Moreover, the present invention is advantageous in a system where a large number of receiving wireless devices are in the same sector in order to provide a channel grant probability to lessen the likelihood that immediate response requests from the group devices will cause collisions, yet still give a priority to responsive group communications. The system and method can accordingly be implemented on existing infrastructure as the wireless device can ultimately set the probability of receiving an open channel.

Other objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
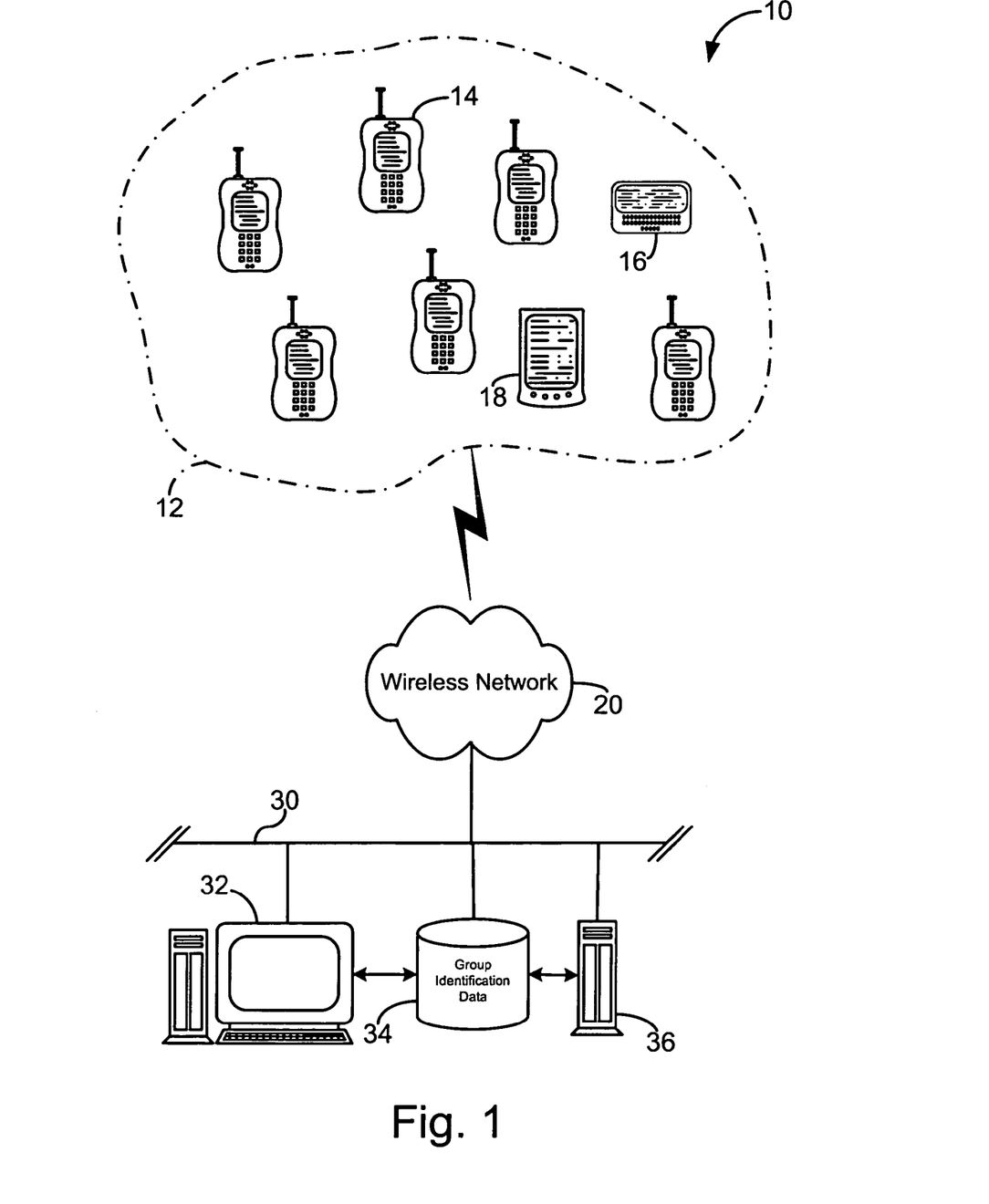
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of a wireless telecommunication system 10 between a group of wireless telecommunication devices (target set 12) on a wireless network 20. Here, the one or more wireless telecommunication devices are in a PTT group, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set 12 of one or more other wireless telecommunication devices with the plurality. For example, the target set for cellular telephone 14 can be all devices in the target set 12 or a subset thereof, such as pager 16 and PDA 18.

In particular, the system 10 can deliver media, such as voice data, multimedia, or other applicants, to very large push-to-talk (or other similar services) calls defined in ad-hoc fashion. These PTT calls can involve a very large number of call participants (several hundred) who can be scattered across an operator's wireless network 20 or who may all be located in a small number of sectors on the same network resources.

In one embodiment, a group communication server 32 selectively receives requests to bridge direct communications between the communicating wireless telecommunication devices 14,16,18 and the one or more other wireless telecommunication devices in the target set 12 designated for the communicating wireless telecommunication device. The communication server 32 then selectively bridges the requested direct communication, such as a PTT voice communication. The identity of the target set 12 is selectively available to the group communication server 32, such as being resident on the group communication server 32 or in a connected database 34, or possibly on another computer device, such as a packet flow-control server 36 (as is common in network infrastructure).

The system 10 minimizes latency for direct group communications among a group of wireless telecommunication devices (set 12) on a wireless network 20. Each wireless telecommunication device 14,16,18 is able to direct a single group communication stream to a designated group (such as all devices of set 12) of the plurality of wireless telecommunication devices, and as further described herein, each wireless telecommunication device 14,16,18 selectively requests and then receiving an open dedicated broadcast channel for an outgoing communication from the wireless telecommunication device, which can include a direct communication stream. The communication server 32 that receives the single communication stream from a communicating wireless device and creates a group communication to all wireless telecommunication devices 14,16,18 of the designated group. A set of one or more of the plurality wireless telecommunication devices selectively receives an open broadcast channel based upon a predetermined probability, and assigns a greater probability of receiving an open broadcast channel for requests to transmit direct group communication streams than for requests to open a broadcast channel that are not for a direct group communication.

Figure 2:
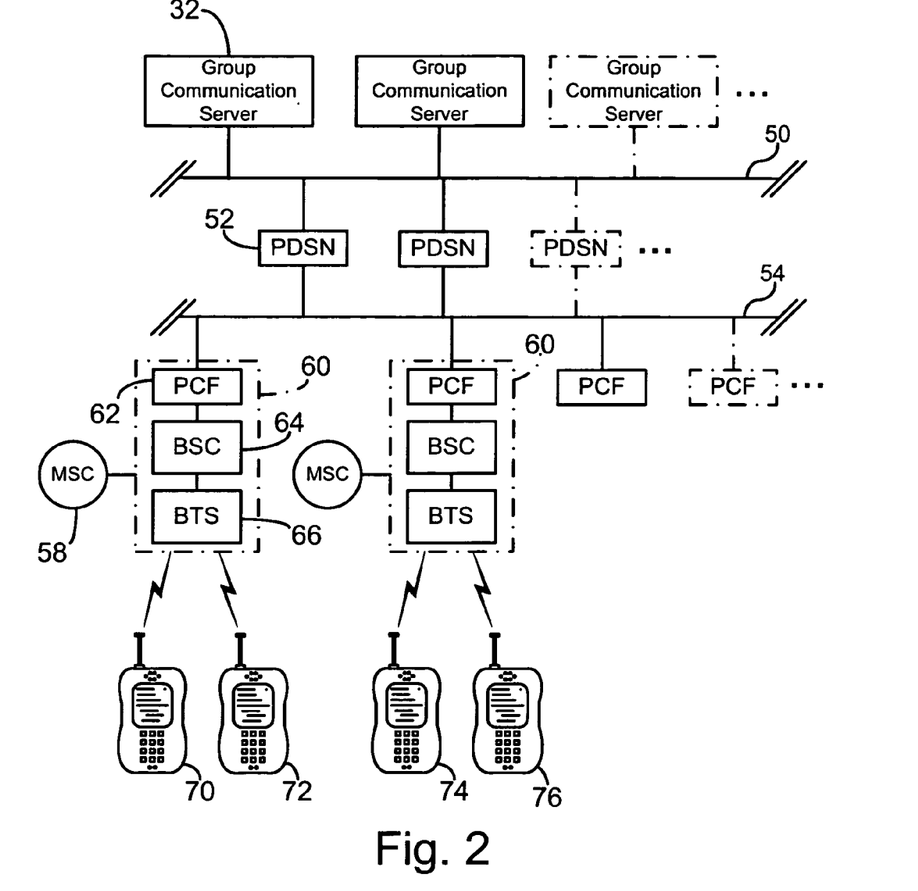
FIG. 2 is a representative diagram of one embodiment of a wireless network in a common cellular telecommunication configuration, having a series of group communication servers control communications between the wireless telecommunication devices of PTT group members.

There are typically one or more intermittent communication devices that bridge communication streams between the communication server 32 and the group of wireless telecommunication devices 12, as is shown in FIG. 2, and the communication server 32 can further determine which member wireless telecommunication devices are able to determine the best mode of communication with the wireless devices 14,16, 18. The communication server 32 will then direct the one or more intermittent communication devices to send data packets to those wireless telecommunication devices of the set 12.

FIG. 2 is a representative diagram of one embodiment of a wireless network in a common cellular telecommunication configuration, having a group communication server 32 control communications between the wireless devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions (such as CDMA) from the group communication server(s) 32 using a data service option.

The group communication server(s) 32 are connected to a wireless service providers packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art.

In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side LAN 30 component that is aware of and/or can retrieve the identity of the members of the set 12, or direct the identity of the members of the set 12 to another computer device.

In a PTT embodiment, the wireless system 10 allows a dispatch voice service that operates over standard commercial wireless infrastructure (CDMA, FDMA, GSM, etc.). In a dispatch model, communication between endpoints (wireless devices 14,16,18) occurs within virtual groups, wherein the voice of one "talker" is broadcast to one or more "listeners". A single instance of this type of communication is commonly referred to as a "dispatch call." A call is an instantiation of a "group," which defines the characteristics of a call. A group in essence is defined by a member list and associated information, such as group name or group ID. In the absence of a wireless multicast channel, each group is formed by the combination of separate point-to-point connections between each endpoint and group communication server(s) 32 assigned to manage the call.

Each region of the PTT infrastructure is deployed over a specific portion of the carrier packet data network. The group communication server(s) 32 within the region may be routing traffic between one or more PDSNs 52 in the carrier network 54. A "direct call" is a call in which there are only two members, a call originator and a call target, that still uses the PTT system. For this call type, the most challenging scenario for meeting performance requirements is the case when the direct call is placed with both the originator and target handset have dormant packet-data connections, i.e. the wireless devices 14,16,18 do not have an open dedicated channel. Conversely, the originator's and/or the target's packet-data connection can be in the active state and dedicated traffic channels are available at the time the direct call is placed. The dormant-to-dormant scenario is the one that provides the greatest challenge in meeting performance requirements and preventing significant latency in call set up, as it is more fully described herein.

Figure 3:
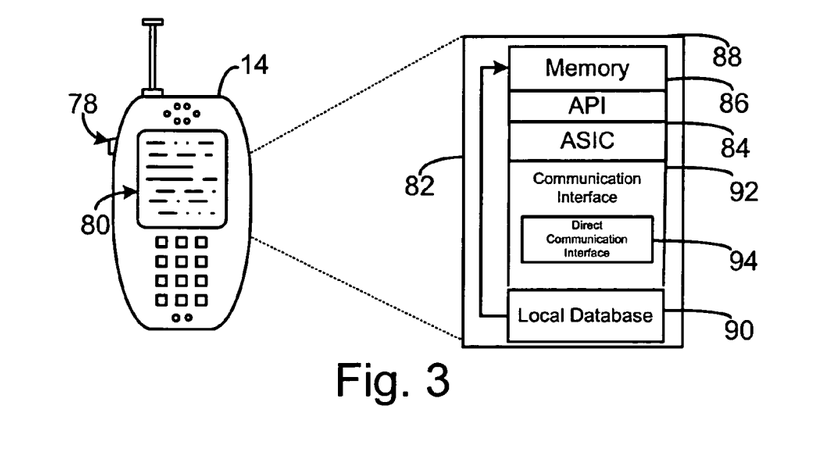
FIG. 3 is a block diagram illustrating the computer platform of the wireless telecommunication device with PTT capability.

FIG. 3 is a block diagram illustrating one embodiment of the wireless telecommunication device being a cellular telephone 14 with a PTT button 78 that opens the direct communication to the target set 12 of devices. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The wireless telephone typically will open a full duplex channel for telecommunication, and in some instances, will communicate via a half-duplex channel, only being able to talk or receive a voice stream.

In this embodiment of the wireless device 14, the computer platform 82 also includes a communication interface 92 that includes a direct communication interface 94 that can open the direct communication channel from the wireless device. The direct communication interface 94 can also be part of the standard communication interface for the wireless device which ordinarily carries the voice and data transmitted to and from the wireless device. The direct communication interface 92 typically is comprised of hardware as is known in the art.

Figure 4:
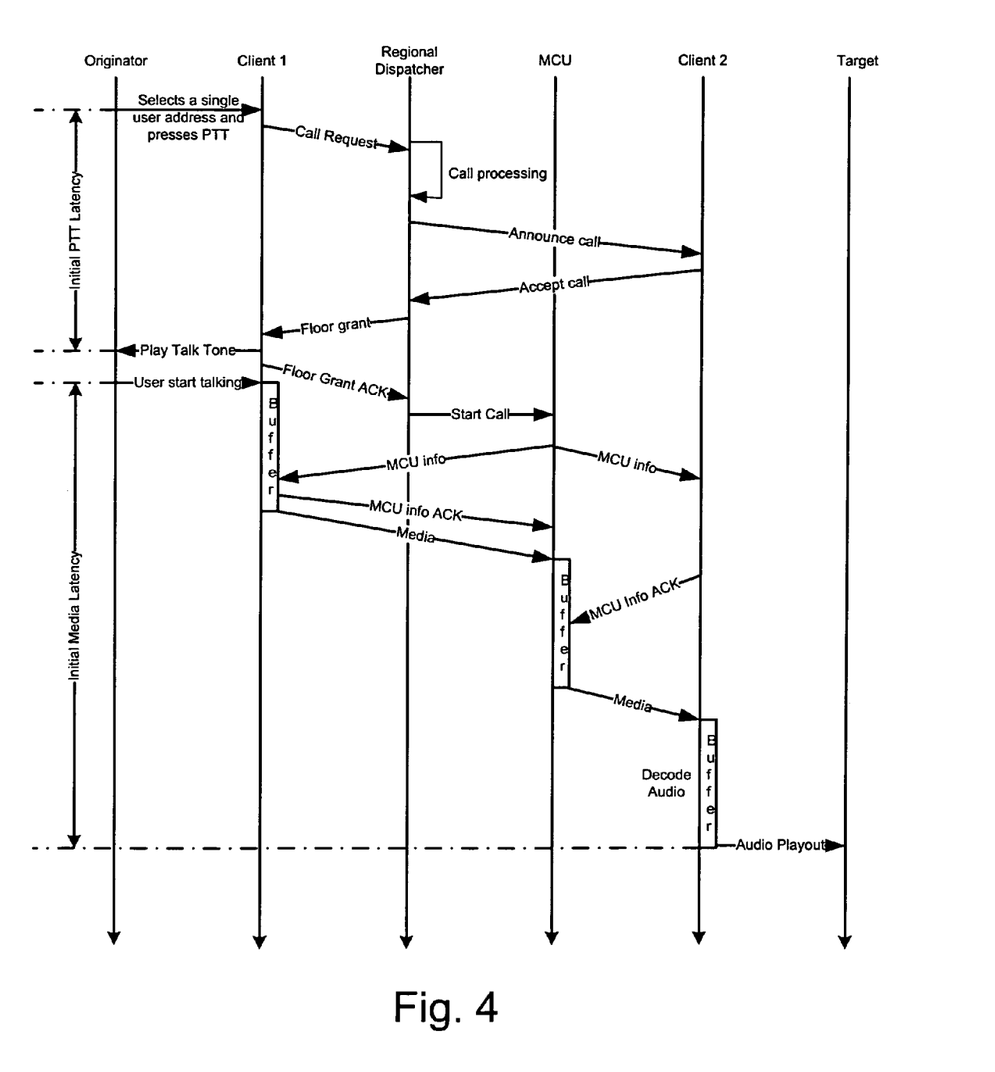
FIG. 4 is a call-progress diagram for application-layer signaling for establishing a PTT communication.

FIG. 4 is a call-progress diagram for application-layer signaling for establishing a PTT communication. It should be noted that call setup signaling can occur via a formal broadcast channel, as opposed to just a generic shared forward link channel such as the Control Channel. For example, in one extant telecommunications system, the system uses a Control Channel (CC) and a separate Broadcast Channel (BCH). The critical performance metrics for direct calls include an initial PTT latency (as shown) where a delay is realized between the time the user presses the PTT button and the time the user is notified (via either an audio or visual means) that the user is granted permission to speak. There is also an initial media latency (as shown) comprised of a delay that is realized between the time the originator starts speaking following the floor grant after the call is first established until the time the target hears the originator's speech.

The application-layer signaling shown in FIG. 4 for establishing a direct call illustrates the application-layer messaging that is exchanged to establish a direct PTT call. The diagram of FIG. 4 does not identify any physical-layer signaling mechanisms as this system can be implemented on a variety of different physical systems.

Figure 5:
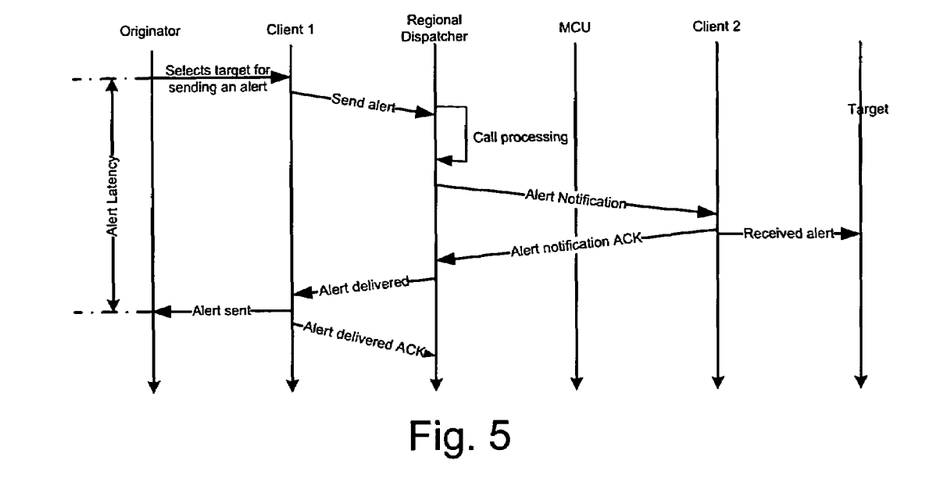
FIG. 5 is a call-progress diagram for application-layer signaling for establishing an alert.

FIG. 5 is a call-progress diagram for application-layer signaling for establishing an alert. An "alert: is a call type that provides a mechanism by which a user notifies another user of a desire to communicate in a direct PTT call. An alert call is completed after a few short application-layer messages are exchanged at the originator, the group communication server 32 and the target wireless device 12,14,16,18. As described for direct call types, the most challenging scenario for meeting performance requirements for alerts is also when the alert is sent and both the originator and target handset have dormant packet-data connections, i.e. no active dedicated channels. Thus, the alert latency (as shown) is the delay from the time the user presses the PTT button 78 to when the user is notified (via either an audio or visual means), indicating the status of the alert delivery. An alert can be established at the physical-layer so this diagram does not identify any physical-layer signaling mechanisms.

Figure 6:
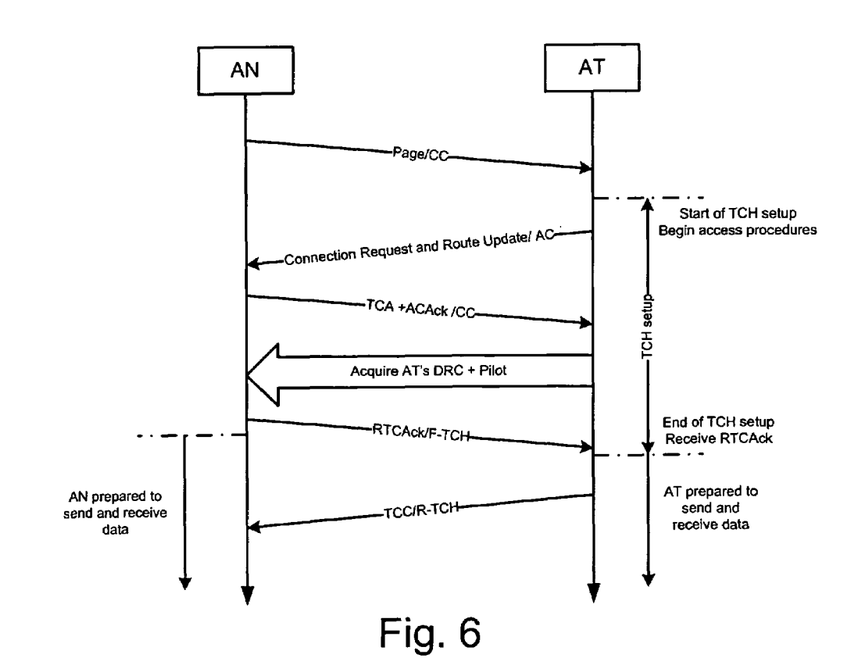
FIG. 6 is a call progress diagram illustrating start and end points to measure traffic channel setup performance.

FIG. 6 is a call progress diagram illustrating start and end points to measure traffic channel (TCH) setup performance. The traffic channel setup time increases as the number of frames in the access probe increases. As shown, the access probe sent by the AT always supplies a request for a dedicated channel, here a "ConnectionRequest," and RouteUpdate message, but it can also supply data over the control or signaling channel, here the "DataoverSignaling" message, to carry application-layer data. The size of the access probe can vary due to the number of hops being reported in the RouteUpdate message, the size of the ConnectionRequest, and the number of bytes sent in the DataOverSignaling message. For purposes of FIG. 6, it is assumed that the AT is able to decode the data on a control channel early, whereas the extreme case is when the AT requires all allotted time of data flow to decode data. In general, the average traffic channel setup performance number should fall well within these two numbers. On average, the early control channel can decode at 38.4 kbps at an effective rate of 153 kbps on the forward link, and the expected traffic channel setup performance is the same with a Control Channel operating at a higher rate of 76.8 kbps. However, performance improves with a faster control channel if less ideal channel conditions exist.

A persistence value preferably allows the AT to transmit on the first attempt such that the initial access probe transmission is successful. The start of traffic channel setup is measured when the AT begins local access procedures to transmit a probe on the access channel. These procedures include waiting for the start of the access channel cycle, performing the persistence test (probability that a dedicated channel will be opened) and transmitting. The end of the traffic channel setup procedure is measured when the AT receives an acknowledgement (RTCAck) message.

Figure 7:
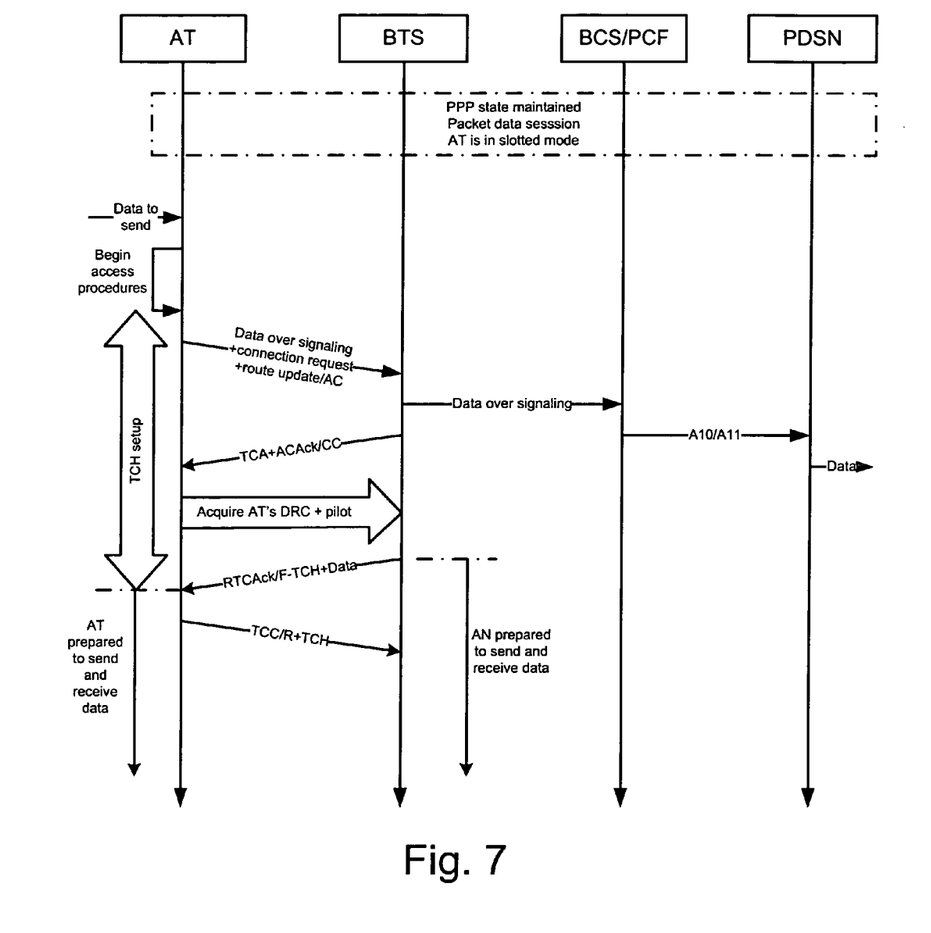
FIG. 7 is a call progress diagram of signaling for a wireless device (AT)-originated data-over-signaling (DOS) message to open the dedicated channel.

FIG. 7 is a call progress diagram of signaling for a wireless device (AT)-originated data-over-signaling (DOS) message to open the dedicated channel. Here, the persistence value allows the AT to transmit on the first attempt such that the initial access probe transmission is successful. In this embodiment, the AT has previously monitored overhead parameters and signatures from the sector and has the data cached locally. When the initial access probe does not succeed, significant delays are incurred in the access attempt procedure. A large portion of this delay is due to the back-off period the AT must wait until it can reattempt its access probe. In setting the probability of connection higher, or absolute, for the PTT access probe, a significant amount of latency can be reduced. In order to improve performance, the ATs are preferable configured with a certain connection probability. It is also important to note that the reverse link data delivery does not place any requirements at the receiving wireless device (AN).

Again with reference to FIG. 7, an AT-originated data approach is illustrated for which the AN must provide support. Time-sensitive data is sent by the AT as a DataOverSignaling (DOS) message over the Access Channel. When sending the initial data the AT may at the same time request to establish a traffic channel (TCH). If a traffic channel is required, the AT sends an access probe supplying the DOS message along with a ConnectionRequest and RouteUpdate message. Once the AN acquires the relevant data (DRC and Pilot) for the TCH communication, the full TCH is setup.

Figure 8:
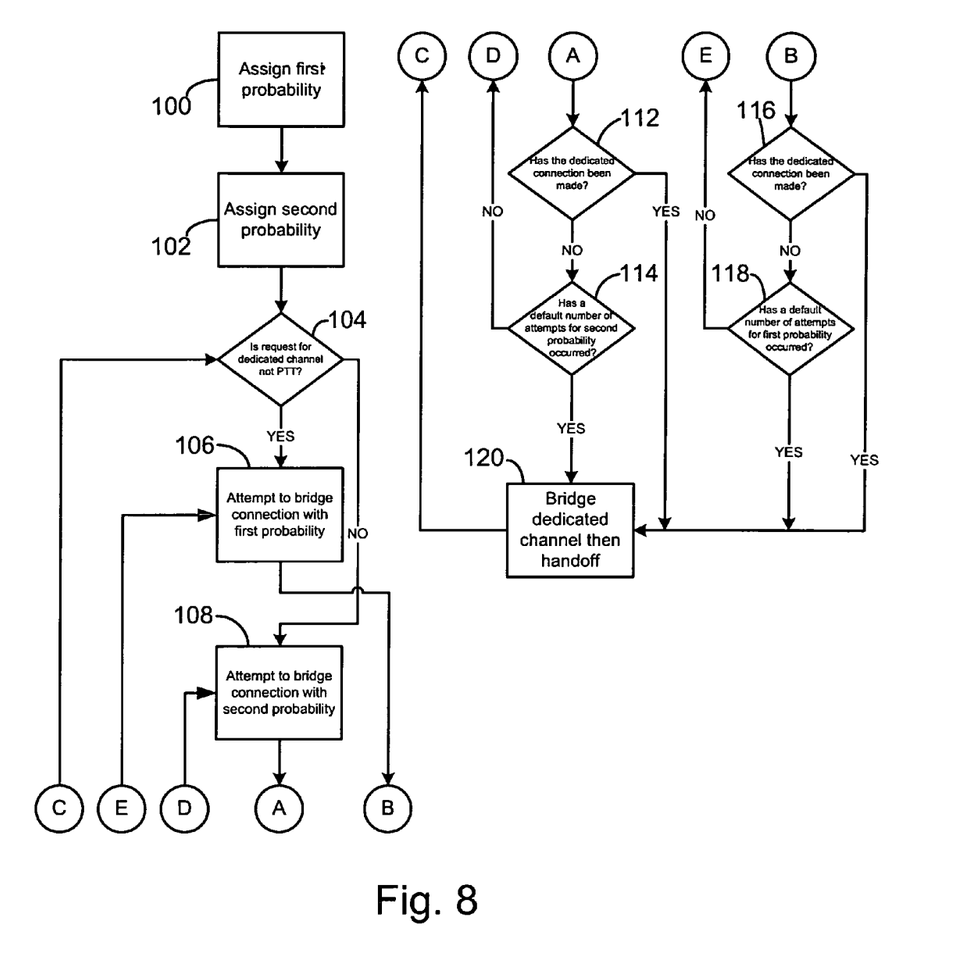
FIG. 8 is a flowchart of one embodiment of the process executing on the wireless device to assign probabilities to request for outgoing dedicated channels to the base station.

FIG. 8 is a flowchart of one embodiment of the process executing on the wireless device 14,16,18 to assign probabilities to request for outgoing dedicated channels to the base station 60. The wireless device 14,16,18 first assigns a first probability for receiving a dedicated channel (such as a TCH) for a not PTT or group direct call, as shown at step 100, and then assigns a second probability to receive the dedicated channel for a PTT or direct group communication, as shown at step 102. These steps can be done at the time of wireless device manufacture in hardware, or in later configuration of the device-resident software. Then a determination is made as to whether an incoming request for a dedicated channel is for a non-PTT or other group communication call, as shown at decision 104. If the incoming request is for a PTT call at decision 104, then an attempt to bridge a dedicated channel with the first probably is performed, as shown at step 106, and the process forward to attempt to bridge the communication and determine if a channel was opened, as shown at decision 116.

Otherwise, if a request is made for a dedicated channel for a PTT or group communication call at decision 104, then the open channel is attempted to be bridged with the second probability of the channel grant, as shown at step 108. A determination is then made as to whether the dedicated channel has been connected, as shown at decision 112. If the open channel has been made, the dedicated channel is bridged and handed off to the communication interface 92, and the process returns to decision 104 to await another call request. Otherwise, if an open channel has not been granted at decision 112, then a determination is made as to whether a certain number of default attempts to bridge the open channel has been done for the PTT call, as shown at decision 114. This default condition for connection applies if there is a probabilistic limitation to the opening of the channel for the PTT call, and can be set higher than for non-PTT attempts due to the higher priority of the call, i.e. connect after two attempts versus five. Of course, in some embodiments, there will be no delay for opening a channel for a PTT call, and thus, there will not be a second probability and these steps unnecessary. If the default number has not been reached at decision 114, then the process iterates to attempt to bridge the connection with the second probability at step 108. If the default number of attempts has been reached at decision 114, then the open channel is bridged and handed off, as shown at step 120, and the process reiterated to a wait state for a request for a dedicated/open channel.

Returning again to decision 116 in which a determination is made as to whether a dedicated connection has been made for the non-PTT call, if the dedicated/open channel has not been made, then a determination is made as to whether a default number of attempts has been made for a first probability of connection, as shown at decision 118. If the open channel has been made at decision 118, then the process bridges and hands off the dedicated channel at step 120 and iterates to the wait state for another dedicated/open channel request. Otherwise, if the default number of attempts has not been made at decision 118, then the process returns to step 106 to attempt to bridge a connection with the first probability.

It can thus be seen that the system 10 provides a method for minimizing latency for direct group communications from a first wireless telecommunication device (such as wireless device 14) to a predetermined group of wireless telecommunication devices on a wireless network, such as set 12. The method includes the steps of requesting, at a wireless telecommunication device (such as wireless telephone 14) that is able to direct a single group communication stream to a designated group of a plurality of wireless telecommunication devices (set 12) on wireless telecommunication network 20, the opening of a dedicated broadcast channel to the wireless telecommunication network 20 for an outgoing communication from the wireless telecommunication device 14,16, 18, such as a traffic channel (TCH). The method then includes the step of assigning a first probability of opening a direct communication stream, such as shown at step 100, and assigning a second probability for opening a direct communication stream for a direct group communication stream, such as shown at step 102. The second probability is greater than the first probability, and alternately, the second probability can be set to 100%, i.e. the channel will always be open. If the request for a dedicated broadcast channel is not for a direct group communication stream, selectively opening a dedicated broadcast channel based upon the first probability, as shown at step 106, and if the request for a dedicated broadcast channel is for a direct group communication stream, selectively opening dedicated broadcast channel based upon the second probability, as shown at step 108.

The method can further include the step of setting a first default duration for the maximum delay between the request for opening a dedicated communication channel and the opening of the dedicated communication channel, which is shown by decision 118. Then the method can further include the step of setting a second default duration for the maximum delay between the request for opening a dedicated communication channel for a direct group communication stream, and the opening of the dedicated communication channel, the second default duration shorter than the first default duration, as shown in decisions 114 and 118. The step of assigning a second probability can be assigning the wireless telecommunications device 14,16,18 to automatically open a broadcast channel to transmit direct group communication streams. In one embodiment, the step of assigning a first probability is assigning a probability of 50%, and the step of assigning a second probability is assigning a probability greater than 50%.

The system 10 also includes an inventive wireless telecommunication device (such as wireless telephone 14 shown in FIG. 3). The wireless telecommunication device is able to direct a single group communication stream to a designated group of a plurality of wireless telecommunication devices, such as set 12, and selectively open dedicated broadcast channels to the wireless telecommunication network for an outgoing communication from the wireless telecommunication device for any direct communication stream. The wireless telecommunication device 14,16,18 implements the inventive method to open dedicated channels for communications.

Another embodiment includes a program resident in a computer readable medium, where the program directs a wireless device having a computer platform to perform the inventive steps of the method. The computer readable medium can be the memory 88 of the computer platform 82 of the wireless telephone 14, or other wireless device, or can be in a local database, such as local database 90 of the wireless telephone 14. Further, the computer readable medium can be in a secondary storage media that is loadable onto a wireless device computer platform, such as a magnetic disk or tape, optical disk, hard disk, flash memory, or other storage media as is known in the art.

In the context of FIG. 8, the method may be implemented, for example, by operating portion(s) of the wireless network 20 to execute a sequence of machine-readable instructions, such as wireless platform 82 and the communication server 32. The instructions can reside in various types of signal-bearing or data storage primary, secondary, or tertiary media. The media may comprise, for example, RAM (not shown) accessible by, or residing within, the components of the wireless network 20. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated

What is claimed is:

1. A system for minimizing latency for group communications among a group of wireless telecommunication devices on a wireless network, comprising:

a plurality of wireless telecommunication devices wherein each wireless telecommunication device is able to direct a single group communication stream to a designated group of the plurality of wireless telecommunication devices, each wireless telecommunication device selectively requesting and then receiving an open dedicated channel for an outgoing communication from the wireless telecommunication device, to include a group communication stream from that wireless telecommunication device; and a communication server that receives the single group communication stream from a communicating wireless device and creates a group communication to all wireless telecommunication devices of the designated group, wherein a set of one or more of the plurality wireless telecommunication devices selectively opens a broadcast channel based upon a predetermined probability, and one or more of the set of wireless telecommunications devices assigns a greater probability of opening a broadcast channel for requests to transmit a group communication stream than for opening a broadcast channel for requests to transmit a non-group communication stream.

2. The system of claim 1, wherein the group communication stream is voice data packets.

3. The system of claim 2, wherein the group communication stream includes application data.

4. The system of claim 1, wherein at least one or more of the set of wireless telecommunications devices automatically opens a broadcast channel for requests to transmit a group communication stream.

5. The system of claim 1, wherein one or more of the set of wireless telecommunications devices assigns a probability of receiving an open broadcast channel for requests to transmit a group communication stream to be greater than 50%.

6. A wireless telecommunication device that is able to direct a single group communication stream to a designated group of a plurality of wireless telecommunication devices on wireless telecommunication network, the wireless telecommunication device selectively opening broadcast channels to the wireless telecommunication network for an outgoing communication from the wireless telecommunication device, to include a group communication stream from that wireless telecommunication device, and wherein the wireless telecommunication device further selectively opens broadcast channels based upon a predetermined probability, and assigns a greater probability of opening a broadcast channel for an outgoing communication for group communication stream than for opening a broadcast channel for an outgoing communication for a non-group communication stream.

7. The device of claim 6, wherein the group communication stream is voice data packets.

8. The device of claim 7, wherein the group communication stream includes application data.

9. The device of claim 6, wherein the wireless telecommunications device automatically opens a broadcast channel for an outgoing communication for a group communication stream.

10. The device of claim 6, wherein the wireless telecommunications devices assigns a probability of transmitting on an open broadcast channel for a group communication stream to greater than 50%.

11. A wireless telecommunication device, comprising:
a means for directing a single group communication stream to a designated group of a plurality of wireless telecommunication devices on a wireless telecommunication network;
a means for selectively opening broadcast channels to the wireless telecommunication network for an outgoing communication from the wireless telecommunication device, to include a group communication stream from that wireless telecommunication device;
and a means for selectively opening the broadcast channel based upon a predetermined probability, the means assigning a greater probability of opening a broadcast channel for an outgoing communication for a group communication stream than for opening a broadcast channel not for a group communication stream.

12. A method for minimizing latency for group communications from a first wireless telecommunication device to a group of wireless telecommunication devices on a wireless network, comprising the steps of:
requesting, at a wireless telecommunication device that is able to direct a single group communication stream to a designated group of a plurality of wireless telecommunication devices on a wireless telecommunication network, the transmission on a broadcast channel to the wireless telecommunication network for an outgoing communication from the wireless telecommunication device;
assigning a first probability of opening a communication stream;
assigning a second probability for opening a group communication stream, the second probability greater than the first probability;
if the request for a broadcast channel is not for a group communication stream, selectively opening a broadcast channel based upon the first probability; and
if the request for a broadcast channel is for a group communication stream, selectively opening the broadcast channel based upon the second probability.

13. The method of claim 12, further comprising the step of setting a first default duration for the maximum delay between the request for opening a dedicated communication channel and the opening of the dedicated communication channel.

14. The method of claim 13, further comprising the step of setting a second default duration for the maximum delay between the request for opening a dedicated communication channel for a group communication stream and the opening of the dedicated communication channel, the second default duration shorter than the first default duration.

15. The method of claim 12, wherein the step of assigning a second probability is assigning the wireless telecommunications device to automatically open a broadcast channel for an outgoing communication for a group communication stream.

16. The method of claim 12, wherein:
the step of assigning a first probability is assigning a probability of 50%; and
the step of assigning a second probability is assigning a probability greater than 50%.

17. A method for minimizing latency for group communications from a first wireless telecommunication device to a group of wireless telecommunication devices on a wireless network, comprising:
a step for requesting, at a wireless telecommunication device that is able to direct a single group communication stream to a designated group of a plurality of wireless telecommunication devices on a wireless telecommunication network, to transmit on a broadcast channel to the wireless telecommunication network for an outgoing communication from the wireless telecommunication device;
a step for assigning a first probability of opening a communication stream;
a step for assigning a second probability for opening a group communication stream, the second probability greater than the first probability;
a step for, if the request for opening a broadcast channel is not for a group communication stream, selectively opening a broadcast channel based upon the first probability; and
a step for, if the request for a broadcast channel is for a group communication stream, selectively opening broadcast channel based upon the second probability.

18. A computer program that, when executed on the computer platform of a wireless telecommunication device, minimizes latency for group communications from that wireless telecommunication device to a group of wireless telecommunication devices on a wireless network, the program causing the wireless device to perform the steps of:

requesting to transmit on a broadcast channel to the wireless telecommunication network for an outgoing communication from the wireless telecommunication device;

assigning a first probability of opening a communication stream;

assigning a second probability for opening a group communication stream, the second probability greater than the first probability;

if the request for a broadcast channel is not for a group communication stream, selectively opening a broadcast channel based upon the first probability; and if the request for a broadcast channel is for a group communication stream, selectively opening the broadcast channel based upon the second probability.

19. The computer program of claim 18, further causing the wireless telecommunication device to perform the step of setting a first default duration for the maximum delay between the request for opening a dedicated communication channel and the opening of the dedicated communication channel.

20. The computer program of claim 19, further causing the wireless device to perform the step of setting a second default duration for the maximum delay between the request for opening a dedicated communication channel for a a group communication stream and the opening of the dedicated communication channel, the second default duration shorter than the first default duration.

21. The computer program of claim 18, wherein the program causes the step of assigning a second probability to be assigning the wireless telecommunications device to automatically open a broadcast channel for an outgoing communication for a group communication stream.

22. The computer program of claim 18, wherein the program further causes:

the step of assigning a first probably to be assigning a probability of 50%; and the step of assigning a second probability to be assigning a probability greater than 50%.

* * * * *

UNITED STATES PATENT AND TRADEMARK OFFICE
CERTIFICATE OF CORRECTION

PATENT NO. : 7,664,517 B2
APPLICATION NO. : 11/155256
DATED : February 16, 2010
INVENTOR(S) : Ananthanarayanan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Twenty-eighth Day of December, 2010

David J. Kappos
*Director of the United States Patent and Trademark Office*